UNITED STATES PATENT OFFICE.

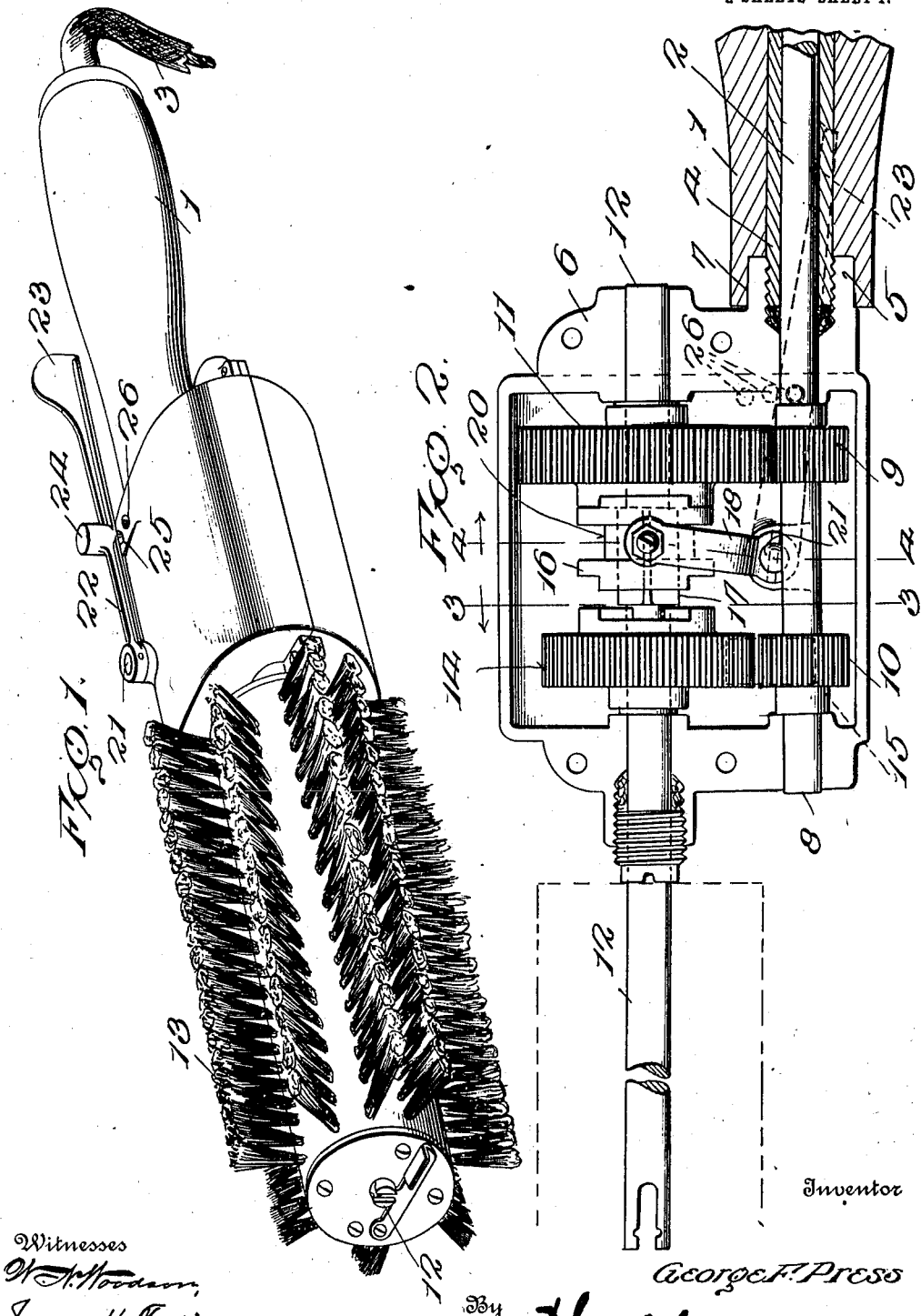

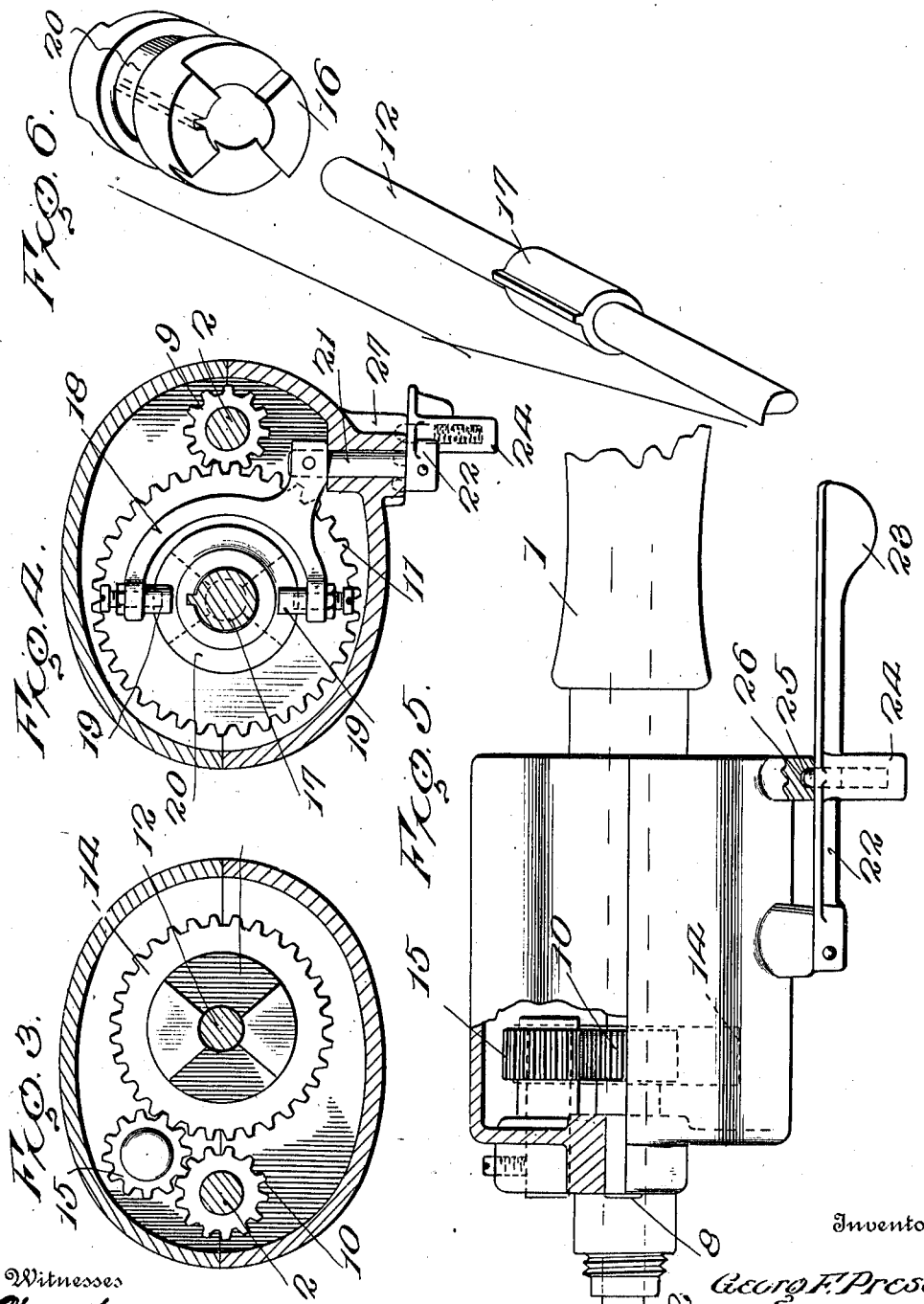

GEORGE F. PRESS, OF SPOKANE, WASHINGTON.

GEARING FOR HORSE-GROOMERS.

982,868.  Specification of Letters Patent.  Patented Jan. 31, 1911.

Application filed February 24, 1910. Serial No. 545,686.

*To all whom it may concern:*

Be it known that I, GEORGE F. PRESS, citizen of the United States, residing at Spokane, in the county of Spokane and State of Washington, have invented certain new and useful Improvements in Gearing for Horse-Groomers, of which the following is a specification.

This invention comprehends certain new and useful improvements in gearing and relates particularly to an improved arrangement of gearing designed for use in the operation of grooming horses, although it is to be understood that the invention is applicable for use generally wherever it is desired to impart motion from a driving shaft to a driven shaft and to secure by a quick movement the reverse rotation of the driven shaft, while the drive shaft rotates continuously in one direction, the device being applicable for use in connection with dental engines, reaming and boring tools, and the like, as well as for the use for which it is primarily designed as above set forth.

The invention has for its primary object a simple durable and efficient construction of device of this character which is composed of comparatively few parts which may be cheaply manufactured and readily assembled, the parts being so arranged that a quick reverse of the driven shaft may be made without affecting the continuous rotation of the drive shaft in one direction, this being particularly advantageous in horse grooming apparatus so that in passing from one portion of the horse's hide to another, the direction of rotation of the brush may be changed whenever desired according to the direction in which the hair lies. And another object of the invention is a device of this type, the parts of which are so correlated with each other that the operator may reverse the movement of the driven shaft by manipulating the device with the thumb or finger of the same hand that grasps the handle, the adjustment of the device being capable of being performed entirely by one hand, thereby leaving the other hand of the operator free.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a perspective view of one form or embodiment of my invention; Fig. 2 is an elevation of the interior of the casing, one half thereof being removed and some parts being shown in section and others in dotted lines; Fig. 3 is a transverse sectional view of the device on the line 3—3 of Fig. 2, looking in the direction of the arrows; Fig. 4 is a similar view on the line 4—4 of Fig. 2, looking in the direction of the arrows; Fig. 5 is a side elevation of the gear casing, a part being broken out and in section; and, Fig. 6 is a detail perspective view of a portion of the driven shaft and the double clutch member adapted to be mounted thereon.

Corresponding and like parts are referred to in the following description and indicated in all the views of the drawings by the same reference characters.

As is customary in this class of devices, a handle 1 is provided whereby the device may be freely held by one hand of the operator, and a drive shaft 2 is mounted in said handle and receives a continuous rotary movement in one direction, as through the instrumentality of a flexible shaft, a portion of which is indicated at 3 in Fig. 1. The handle embodies a bushing 4 which is screwed into a boss 5 formed on a two-part casing 6, the two parts or halves of the casing being complemental and being adapted to be secured together in any desired way. The wooden portion 1 of the handle is recessed, as indicated at 7, to receive the two-part bushing 5 of the casing. The shaft 2 extends through the casing from end to end, as shown, being journaled therein at one end, as indicated at 8.

The shaft 2 carries, within the casing 6, two spur pinions, both of which are fast thereon, one pinion being designated 9 and the other 10. The spur pinion 9 is always in mesh with a gear wheel 11 which is mounted loose on the driven shaft 12 journaled in the casing 6 and extending forwardly therefrom so as to carry the brush 13. The shaft 12 also carries a loose gear wheel 14 which meshes with an idler pinion 15 and the latter in turn meshes with the spur pinion 10 before mentioned. Between the gear wheels 11 and 14 a double clutch member 16 is mounted, said clutch member being designed to alternately engage the clutch faces of the gear wheels, as indicated best in Fig. 2. The clutch member 16 has a spline connection with a collar or sleeve 17 fast on the shaft 12, and the said clutch member is operated by means of a yoke 18 which is provided with rollers 19 mounted in the groove 20 of the clutch member, said yoke being secured to and movable with a stub shaft or spindle 21 journaled in the casing, as best illustrated in Fig. 4. The spindle 21 projects outside of the casing, as shown, and to its outer projecting end a shipper lever 22 is connected at one end. The opposite end of said shipper lever extends along the handle 1 and is provided with a finger or thumb piece 23, whereby it may be easily manipulated by the same hand of the operator which grasps the handle 1. The shipper lever 22 is provided intermediate of its ends with a hollow boss 24 in which a spring pressed detent 25 is mounted, said detent being designed to snap in any one of three sockets 26 which are formed in the exterior walls of the boss 27 in which the spindle 21 is mounted, whereby to prevent the accidental movement of the shipper lever after it has been adjusted to the desired position.

From the foregoing description in connection with the accompanying drawings, the operation of my improved gearing will be apparent.

In the practical use of the device, the gear wheels 11 and 14 will be continuously rotated in opposite directions, while the drive shaft 2 will be continuously operated in one direction. If it be desired to turn the shaft 12 in a direction opposite to that in which the shaft 2 is located, the operator, grasping the handle 1 with his right hand, will use his thumb or finger against the thumb piece 23 to swing the shipper lever 22 over to the left and will thereby carry the clutch member 16 into engagement with the gear wheel 11 so as to secure the gear wheel 11 to the shaft 12. If it be desired to turn the shaft 12 in the same direction as the drive shaft 2, the shipper lever will be swung over to the right so as to effect the engagement of the clutch 16 with the gear wheel 14, and in order to stop the rotation of the shaft 12 without affecting the continuous rotation of the drive shaft 2, it is only necessary to bring the shipper lever to a middle position, whereupon the clutch will be directed to a neutral position between the two gear wheels 11 and 13, permitting them both to run free in opposite directions as the shaft 2 is rotated.

Having thus described the invention, what is claimed as new is:

1. A gearing of the character described, comprising a casing, a handle connected thereto, a drive shaft journaled in the casing and handle, pinions mounted within the casing and secured fast on the drive shaft, a driven shaft journaled in the casing and extending parallel to the drive shaft, two gear wheels loose on the driven shaft, one of said gear wheels meshing with one of said pinions, an idler mounted in the casing and meshing with the other pinion and the other gear wheel, said gear wheels being spaced from each other and provided with opposing clutch faces, a clutch member splined on the driven shaft and located between the gear wheels and arranged for engagement with either of them, a yoke engaging said clutch member a spindle journaled in the casing and extended at right angles to the drive and driven shafts in a plane between the gear wheels and pinions, the spindle having an end projecting out of the casing, the yoke being secured to the spindle at the inner end thereof, and a shipper lever connected to the outwardly projecting end of the spindle and projecting along the handle, and mounted to swing laterally relative thereto, substantially as described.

2. A gearing of the character described, comprising a casing, a handle connected thereto, a drive shaft journaled in the casing and handle, pinions mounted within the casing and secured fast on the drive shaft, a driven shaft journaled in the casing and extending parallel to the drive shaft, two gear wheels loose on the drive shaft, one of said gear wheels meshing with one of said pinions, an idler mounted in the casing, and meshing with the other pinion and other gear wheel, said gear wheels being spaced from each other, and formed with opposing clutch faces, a clutch member splined on the driven shaft and located between the gear wheels and adapted for engagement with either of them, a yoke engaging said clutch member, a spindle to which the yoke is connected, the spindle being journaled in the casing and extending at right angles to the drive and driven shafts, and having an end projecting out of the casing, a shipper lever connected to the outwardly projecting end of the spindle, and extending beyond the casing along the handle, and movable laterally relative thereto, the casing being formed with an exterior boss having a transversely extending series of sockets, the shipper lever being formed with a hollow boss, and a spring pressed detent mounted in the last named boss and adapted to snap into said sockets.

3. A gearing of the character described, comprising a casing, a handle connected thereto, a drive shaft journaled in the casing and handle, pinions mounted within the casing and secured fast on the drive shaft, a driven shaft journaled in the casing and extending parallel to the drive shaft, two gear wheels loose on the driven shaft, one of said gear wheels meshing with one of said pinions, an idler meshing with the other pinion and other gear wheel, said gear wheels being spaced from each other and formed with opposing clutch faces, a clutch member splined on the driven shaft and located between the gear wheels and adapted for engagement with either of them, a yoke engaging said clutch member, a spindle journaled in the casing and extending at right angles to the drive and driven shafts, the yoke being secured to said spindle, the spindle having an end projecting out of the casing, a shipper lever connected to the outwardly projecting end of the spindle and extending along the handle, the casing being provided with sockets, the shipper lever being formed with a hollow boss, and a spring pressed detent mounted in said boss and adapted to snap into said sockets, as and for the purpose set forth.

In testimony whereof I affix my signature in presence of two witnesses.

GEORGE F. PRESS. [L. S.]

Witnesses:
A. C. EDWARDS,
J. E. RUDERSDORF.